Oct. 29, 1968  R. M. TUCK ET AL  3,407,686

TRANSMISSION

Original Filed Oct. 22, 1962

INVENTORS
Robert M. Tuck &
Ulysses R. Breting

ATTORNEY

United States Patent Office 3,407,686
Patented Oct. 29, 1968

3,407,686
TRANSMISSION
Robert M. Tuck and Ulysses A. Breting, Indianapolis, Ind., assignors to General Motors Corporation, Detroit, Mich., a corporation of Delaware
Original application Oct. 22, 1962, Ser. No. 231,917, now Patent No. 3,256,751, dated June 21, 1966. Divided and this application Feb. 28, 1966, Ser. No. 530,617
10 Claims. (Cl. 74—701)

ABSTRACT OF THE DISCLOSURE

A transmission having a dual turbine torque converter, driving through combining spur gearing having a speed responsive one way clutch, a two speed forward and one reverse drive gear unit. The gear unit has a front input shaft portion splined by a dual sun gear member to a rear shaft portion, forward and reverse reduction gearing driven by the sun gear to drive an output clutch unit with an output gear thereon and a clutch connecting the rear shaft portion to the output clutch unit. Lubricant is supplied through the front shaft portion to the space between shaft portions and centrifuged through holes in the sun gear. The output clutch unit is formed by the output gear and a cylinder disc with a piston actuating the clutch plates.

---

This invention relates to transmissions and more particularly to a transmission gear unit, and is a division of the applicants' application S.N. 231,917, filed Oct. 22, 1962, now Patent No. 3,256,751.

The transmission employs a dual turbine torque converter, a combining gear set and a two speed forward and reverse gear set. The first turbine output is connected through a gear set and a one-way clutch to the torque converter output. The second turbine is connected through a gear set directly to the torque converter output or intermediate shaft to provide reduced torque in the transmission unit. The intermediate shaft drives a two speed forward and reverse transmission unit and is directly connected to the input sun gears of the low and reverse planetary gear sets. In the low gear set the carrier provides the output when the ring gear is held for low ratio drive. The intermediate shaft may also be connected directly to the output carrier by the high clutch to provide high ratio. The output carrier is connected to the ring gear of the reverse gear set and when the carrier of the reverse gear set is held by the reverse brake, reverse drive of the output carrier by the ring gear is provided. The intermediate shaft has integrally formed hubs at both ends and is splined together by the dual sun gear to permit assembly in a housing having bearings at opposite sides of the reduction forward and reverse gear sets. The direct drive clutch housing is supported in the housing and an end cap on the housing and in turn rotatably supports the intermediate shaft. The output shaft is formed on the perimeter of the clutch housing.

An object of the invention is to provide a two-speed forward and one-speed reverse gear set having a spur gear output between two of the ratio drives to provide a simple and economical arrangement for a drop-box transmission.

Another object of the invention is to provide a housing supporting a gear unit and two-part central shaft at both ends and having a gear member drive connecting said two-part shaft.

These and other objects of the invention will be more apparent from the following description and drawings of the preferred embodiment.

Figure 1:
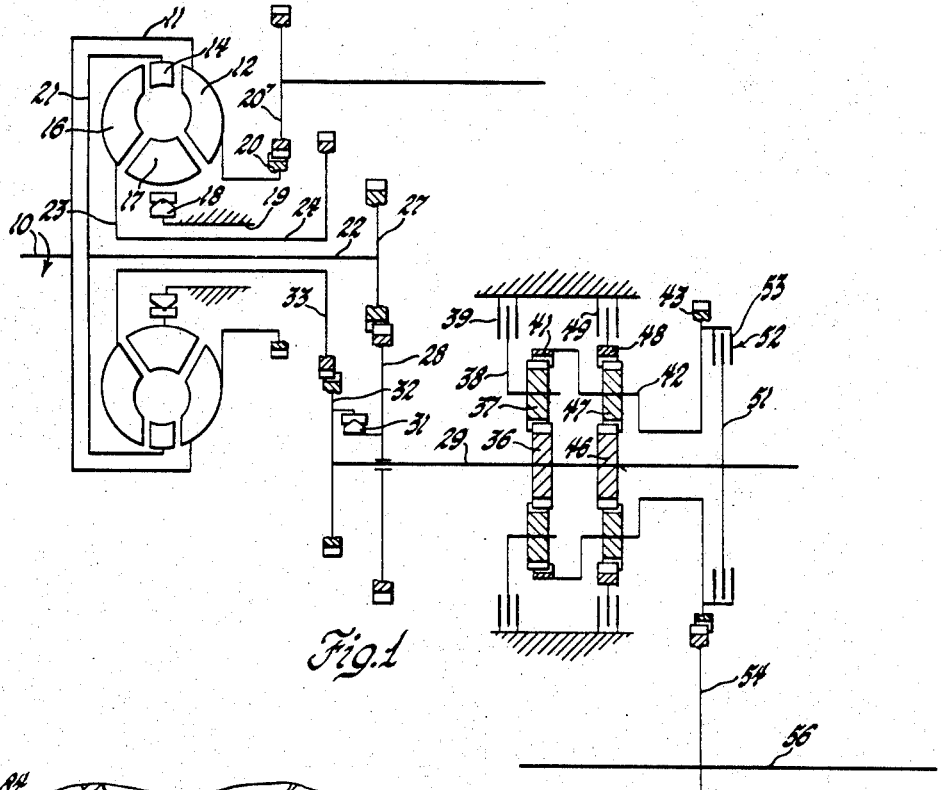
FIGURE 1 is a diagrammatic showing of the torque converter and transmission gearing.

The transmission gearing arrangement, as shown in FIGURE 1, has an input shaft 10 driving a conventional rotary torque converter housing 11 which drives the torque converter pump 12. The torque converter pump 12, the first turbine 14, the second turbine 16 and the stator 17 have conventional inner and outer shells with blading therebetween forming a conventional torque converter torus chamber in which the fluid circulated by the pump 12 flows to the first turbine 14 and second turbine 16 to drive the first and second turbines. The stator 17 may be connected by a suitable one-way brake 18 to the grounded sleeve 19. The first turbne 14 is connected by a drum hub 21 to the first turbine output shaft 22. The second turbine 16 is connected by the hub 23 to the second turbine output shaft 24. A gear 20 fixed on the rotating housing 11 drives the accessory and power takeoff drive gear 20'.

The first turbine output shaft 22 drives a spur gear 27 meshing with a spur gear 28 which is rotatably mounted on the intermediate shaft 29 and connected to drive, through the one-way clutch 31, a spur gear 32 which drives the intermediate shaft 29. The second turbine output shaft 24 drives a spur gear 33 which meshes with the spur gear 32 to drive the intermediate shaft 29. The first turbine spur gear set, gears 27 and 28, provides a speed reducing and torque multiplying gear set. The second turbine drives the spur gear set 33–32 having a speed increasing and torque reducing ratio to provide a reduced torque on the intermediate shaft or input to the two-speed forward and reverse gear set.

The intermediate shaft 29 is the input to the two-speed forward and reverse transmission unit. The intermediate shaft 29 drives the sun gear 36 of the reverse gear set which meshes with planetary pinions 37 mounted on the carrier 38. The carrier 38 is retarded by the reverse brake 39 to hold the carrier so that the input sun gear 36 driving through the pinion 37 drives the ring gear 41 and the associated low speed carrier 42 and output gear 43 in a reverse direction. The intermediate shaft 29 also drives the low speed sun gear 46, which meshes with the planetary pinions 47 mounted on the output carrier 42. The pinions 47 mesh with the ring gear 48 which is held stationary by the low speed brake 49 to provide forward reduction drive of the output carrier 42 and output gear 43. The intermediate shaft 29 also drives the driving plate 51 of the high speed clutch 52 which has a driven plate 53 connected to the output gear 43 located between the low speed gear set and the high speed clutch. The transmission output gear 43 meshes with the final output gear 54 driving the output shaft 56. The output gear set 43–54 provides a speed increasing and torque reducing ratio, i.e., 52–44 to further increase the output speed. If it is desired to provide an overall gear ratio of 1:1 through the transmission when the torque converter is in the coupling stage and the direct drive or high ratio clutch is engaged in the transmission, a speed reducing output gear set may be used.

The one-way roller clutch 31 may be constructed as shown in detail in the applicants' S.N. 231,917.

Figure 2:
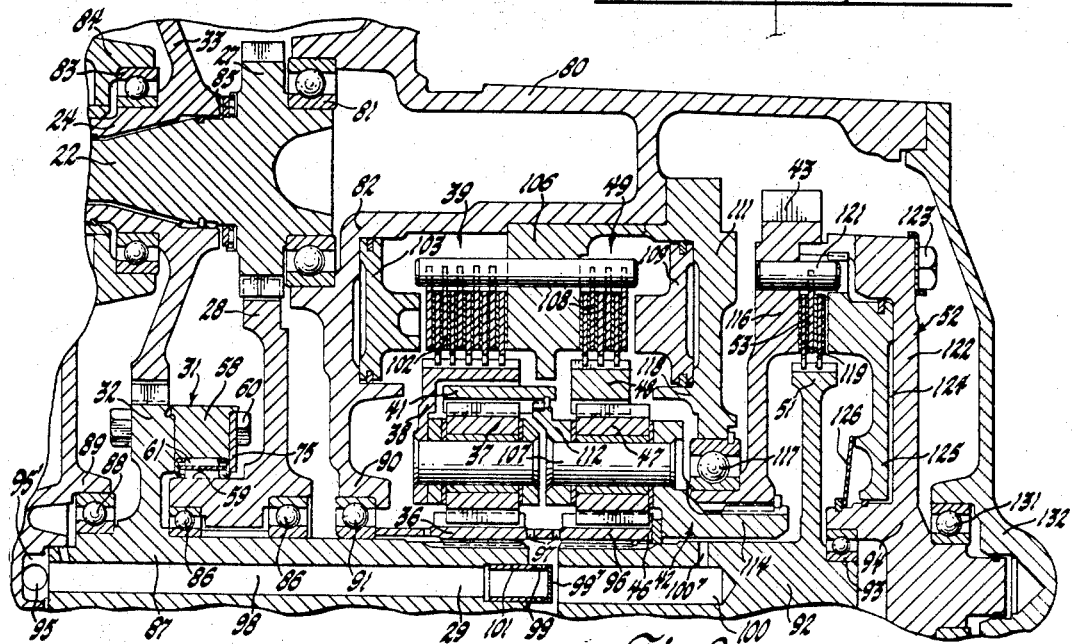
FIGURE 2 is a detailed enlarged view of the transmission gearing.

A preferred embodiment of the transmission gearing assembly shown in FIGURE 1 is shown in FIGURE 2. The first turbine output shaft 22 is rotatably supported at the front on the converter pump housing and is rotatably supported and axially located at the rear by the bearing 81 mounted in the portion 82 of the transmission housing 80. Preferably, bearing 81 takes rear thrust and bearing 85 transmits forward thrust to shaft 24 and bearing 83. The second turbine shaft 24 is rotatably supported at the front on the first turbine shaft and is rotatably supported and axially located at the rear by the bearing 83 mounted in another portion 84 of the transmission housing. Preferably, a bearing 83 takes forward thrust and rear thrust is transmitted by bearing 85 and shaft 22 to bearing 81. Needle thrust bearing 85 is located between shafts 22 and 24. The shaft 22 drives the gear 27 fixed thereon which meshes with gear 28 rotatably mounted by thrust bearing 86 on the forward portion 87 of intermediate shaft 29. The second turbine shaft 24 has a gear 33 mounted thereon meshing with the gear 32 fixed to the intermediate shaft portion 87 which is rotatably mounted by the thrust bearing 88 in the housing portion 89. This forward shaft portion is also rotatably supported by the bearing 91 mounted in the housing portion 90. The intermediate shaft 29 also has a rear portion 92 rotatably mounted and located by the bearing 93 in the portion 94 of the output clutch housing 122. The forward intermediate shaft 87 and rear intermediate shaft 92 are each splined to the sleeve shaft 96 which has thereon sun gears 36 and 46. Central apertures 97 in the sleeve shaft are located between the two intermediate shaft portions and supplied with lubricant by the lubricating passage 98 which supplies lubricant via the radial orifices 99 in the passage extension 101 to throw a stream of oil through the apertures 97 to lubricate the gearings and particularly the carrier pinion shafts. The extension 101 has an axial orifice passage 99' supplying oil via passages 100 and 100' to lubricate carrier 42 and clutch plates 53. Lubricant is supplied to passage 98 by lubrication line 95 supplying chamber 95' in housing portion 89.

The pinions 37 are mounted on the carrier 38 which is splined to the intermediate discs of the friction brake discs 102. The alternate plates of brake discs 102 are suitably splined to the transmission housing 80. The discs are engaged to provide reverse drive by the fluid motor 103 which consists of a piston and a cylinder formed in the housing portion 82. A fixed housing portion 106 provides a suitable fixed abutment for the brake plate 102.

The planetary pinions 47 are mounted on a pinion shaft 107 which is a part of the carrier assembly 42. Pinions 47 mesh with the ring gear 48 which is splined to the intermediate discs of the low brake discs 108. The alternate discs are suitably splined to the housing 80. The fluid motor 109 for actuating the brake discs consist of a piston mounted in the cylinder in the housing portion 111. The housing portion 106 also provides a fixed abutment for the low brake discs. Suitable retraction springs not shown return the low and reverse brake pistons to the disengaged position.

The carrier assembly 42 also includes a member 112 connecting the planetary pinion shaft 107 to the ring gear 41 and a sleeve shaft portion 114 connecting the pinion shaft 107 to the drum portion 116 on which the output gear 43 is mounted. The drum portion 116 is rotatably supported and axially located by the bearing 117 on the housing portion 118. The drum 116 also provides a fixed abutment for the high clutch plates 119 which have alternate plates attached to the driving plate 51 driven by the rear intermediate shaft portion 92 and intermediate plates splined by pins 121 to the drum 116. A cylinder housing 122 is suitably secured by bolts 123 to the drum 116 and has an internal annular recess providing cylinder 124 in which a piston 125 reciprocates to engage the plates 119 to engage the high clutch. The pin 121 fits in an aperture in the piston to prevent rotary movement of the piston. The high clutch is retracted by the Belleville spring 126. The clutch cylinder member 122 rotates with the drum 116 and is rotatably supported and axially located by the bearings 131 mounted in the housing portion 132.

As pointed out above, the low brake 49 and the reverse brake 39 function to provide low and reverse drive of the output gear 43. The high clutch provides a direct drive between the intermediate shaft assembly 29 and the output gear 43. This two-speed and reverse gear arrangement provides a simplified and rugged construction employing large diameter clutches and brakes permitting the use of a large spur gear output drive for a drop box transmission.

The above preferred embodiment may be modified within the scope of the claims.

We claim:

1. In a transmission; a fixed housing having front, central and rear transverse walls; input means including a front shaft portion rotatably supported in said front wall of said housing and having an integral input hub forward of said front wall and a rear shaft portion having an integral clutch hub; means connecting said shaft portions to transmit drive and permit axial assembly and disassembly; a rotary housing having an annular gear disc with an output gear on the external perimeter and an internally splined bore, a piston in said cylinder and means at the outer perimeter to secure said discs together with the gear disc and piston spaced from each other; said discs being located on opposite sides of said clutch hub; said cylinder disc being rotatably supported on said rear wall of said fixed housing; said input means also being rotatably supported on said cylinder disc; gear unit means located between said front and central walls and having an externally splined output sleeve shaft in said splined bore drive connecting said input means to said gear disc and output gear for selectively providing a plurality of gear ratio output drives, bearing means on said central wall rotatably supporting said sleeve shaft and annular gear disc at the inner diameter of said annular gear disc; clutch means having plates in the space between said gear disc and piston with one drivingly secured to said discs and another drivingly secured to said clutch hub and means for selectively operating said piston for selectively connecting said input shaft to said gear disc and said output gear providing another output drive.

2. In a transmission; a fixed housing; input means rotatably supported in said housing; a rotary housing having a peripheral drum portion and front and rear walls, bearing means between the central portion of each of said wall portions and said fixed housing rotatably supporting said rotary housing on said fixed housing, a gear unit means drive connecting said input means to said rotary housing selectively providing a plurality of gear ratios, clutch means selectively connecting said input means to said rotary housing; output means on the outer perimeter of said rotary housing, said input means including a front shaft portion having an integral input gear at the front end and splines at the rear end and a rear shaft portion having an integral clutch hub at the rear end and splines at the front end; said gear unit means having an input gear member splined to both of said splines to connect said shaft portions; said clutch means selectively connecting said clutch hub to said rotary housing; said fixed housing having a first wall rotatably supporting said front shaft portion between said input gear and said gear unit means, a second bearing means supporting said rear shaft portion on said rotary housing.

3. The invention defined in claim 2 and a second input gear rotatably mounted on said front shaft portion between said integral input gear and said first wall, one-way clutch means connecting said second input gear to said integral input gear.

4. The invention defined in claim 3 and said clutch means including plates alternately connected to said clutch hub and said drum portion, and an annular cylinder in one wall of said rotary housing having a piston therein to actuate said clutch means.

5. In a transmission; a fixed housing; input means rotatably supported on said housing having a front shaft portion with an external spline at the rear end and a rear shaft portion with an internal spline at the front end; output means rotatably supported on said housing concentrically with said rear shaft portion; a gear unit means having an input gear member having internal splines engaging said external splines connecting both said shaft portions and driven gear means meshing with said input gear selectively connected to drive said output means at a plurality of speed ratios and drive means selectively connecting said rear shaft portion to said output means for another drive.

6. In a transmission; a fixed housing; input means rotatably supported on said housing; said input means having a front shaft portion with an external spline at the rear end and a rear shaft portion with an external spline at the front end; output means rotatably supported on said housing; a gear unit means having an input gear member having internal splines engaging the external splines on said shaft portions and gearing means meshing with said input gear member selectively driving said output means at a plurality of speed ratios; said shaft portions being spaced apart to form a chamber between the shaft portions and within said input gear members; means to supply lubricating fluid to said gear unit means including a passage through one of said shaft portions connected to said chamber and holes in said input gear member radially communicating with said chamber to centrifuge oil from said chamber to said gear unit means.

7. In a transmission; a fixed housing; input means having a front shaft portion and a rear shaft portion spaced apart to provide a space between said shaft portions; output means; a gear unit means having an input gear member connecting said shaft portions and connected to drive said output means at a plurality of speed ratios, means to supply lubricating fluid to said gear unit means including a passage through one of said shaft portions connected to said space and holes in said input gear member radially communicating with said space to centrifuge oil to said gear unit means, said output means including a rotary housing; said fixed housing having bearing means rotatably supporting said rotary housing on both sides of said rotary housing; and clutch means located inside said rotary housing drive connecting said rear shaft portion to said rotary housing.

8. The invention defined in claim 7 and said gear unit including a rear gear set having a sun gear on said gear member, a ring gear and a carrier having pinions meshing with said sun and ring gear and a front gear set having a sun gear on said gear member, a ring gear connected to said carrier of said rear gear set and a carrier having pinions meshing with said sun and ring gear; brake means to hold the ring gear of said rear gear set, brake means to hold the carrier of said front gear set, said carrier of said rear gear set being connected to said rotary housing; an input hub integrally formed on said front shaft portion; bearing means on said fixed housing supporting said front shaft portion on both sides of said input hub, a bearing supporting said rear shaft portion on said rotary housing, an output gear on the external perimeter of said rotary housing.

9. The invention defined in claim 7 and passage means in said rear shaft portion to supply fluid to said rotary housing for cooling said clutch means.

10. In a transmission; a fixed housing; input means including a front shaft portion having splines at the rear end and a rear shaft portion having splines at the front end rotatably supported in said housing; a rotary housing having a peripheral portion and front and rear walls, bearing means between the central portion of each of said walls portions and said fixed housing rotatably supporting said rotary housing on said fixed housing; multi-ratio gear means having an input gear with splines engaging the splines of said front and rear shaft portions to drivingly connect said shaft portions; and said gear means also drive connecting said input means through said input gear to said rotary housing and selectively providing a plurality of gear ratios, clutch means located in said rotary housing selectively connecting said rear shaft portion to said rotary housing; output means on the outer perimeter of said rotary housing; further bearing means between said fixed housing and front shaft portion and between said rotary housing and rear shaft portion.

References Cited

UNITED STATES PATENTS

| | | | |
|---|---|---|---|
| 781,304 | 1/1905 | Riotte | 74—765 |
| 1,132,958 | 3/1915 | Miller | 192—112 |
| 1,368,882 | 2/1921 | Blumberg | 74—701 X |
| 2,372,817 | 4/1945 | Dodge | 74—761 X |
| 2,433,052 | 12/1947 | Kelley | 74—765 X |
| 2,600,592 | 6/1952 | Watson | 74—763 X |
| 2,803,974 | 8/1957 | Kelley | 74—677 |
| 2,829,542 | 4/1958 | Swennes | 74—688 |
| 3,009,369 | 11/1961 | Flinn | 74—677 X |

FRED C. MATTERN, JR., *Primary Examiner.*

THOMAS C. PERRY, *Assistant Examiner.*